(12) United States Patent
Heine et al.

(10) Patent No.: US 6,290,852 B1
(45) Date of Patent: Sep. 18, 2001

(54) METHOD AND APPARATUS FOR THE PURIFICATION AND/OR TREATMENT OF COMMERCIAL AND/OR INDUSTRIAL WASTE WATERS

(75) Inventors: Wilhelm Heine, Hamburg; Ing Wolfgang Loettel, Köthen; Ing Ralph Günther, Buchholtz, all of (DE)

(73) Assignee: Rochem RO Wasserbehandlung GmbH, Hamburg (DE)

( * ) Notice: Subject to any disclaimer, the term of this patent is extended or adjusted under 35 U.S.C. 154(b) by 0 days.

(21) Appl. No.: 09/454,190

(22) Filed: Dec. 3, 1999

(30) Foreign Application Priority Data

Oct. 26, 1999 (EP) ................................. 99 121 288

(51) Int. Cl.$^7$ ....................................... C02F 3/12
(52) U.S. Cl. ................... 210/622; 210/626; 210/631; 210/195.2; 210/195.3; 210/257.2
(58) Field of Search ................. 210/104, 195.1, 210/195.2, 195.3, 257.2, 258, 259, 614, 622, 626, 631, 638

(56) References Cited

U.S. PATENT DOCUMENTS

| | | | |
|---|---|---|---|
| 4,749,494 | * | 6/1988 | Tomoyasu et al. ............... 210/631 |
| 4,812,237 | * | 3/1989 | Cawley et al. .................... 210/631 |
| 5,151,187 | * | 9/1992 | Behmann ......................... 210/195.2 |
| 5,401,400 | * | 3/1995 | Tonelli et al. .................... 210/195.2 |
| 5,746,920 | * | 5/1998 | Boergardts et al. .............. 210/631 |
| 5,997,736 | * | 12/1999 | Sumino et al. .................. 210/631 |
| 6,007,712 | * | 12/1999 | Tanaka et al. ................... 210/195.2 |
| 6,080,316 | * | 6/2000 | Tonelli et al. ................... 210/195.2 |
| 6,080,317 | * | 6/2000 | Wagner et al. .................. 210/195.2 |

* cited by examiner

Primary Examiner—Christopher Upton
(74) Attorney, Agent, or Firm—Klaus J. Bach

(57) ABSTRACT

In a method and apparatus for the purification and/or treatment of communal and/or industrial wastewaters, particularly for use in marine installations, a biologically operated reaction apparatus is provided in which the wastewater to be purified and/or treated is received. In the reaction apparatus, a bio-mass of high concentration is suspended. To this reaction apparatus, the wastewater to be purified and/or treated is supplied. Subsequently, the pre-purified or, respectively, pre-treated wastewater is supplied to a membrane separation apparatus in which it is separated into a permeate and a retentate. The retentate is at least partially returned to the reaction apparatus, whereas the permeate is either discharged as useable or pure water or is returned to the reaction apparatus.

18 Claims, 1 Drawing Sheet

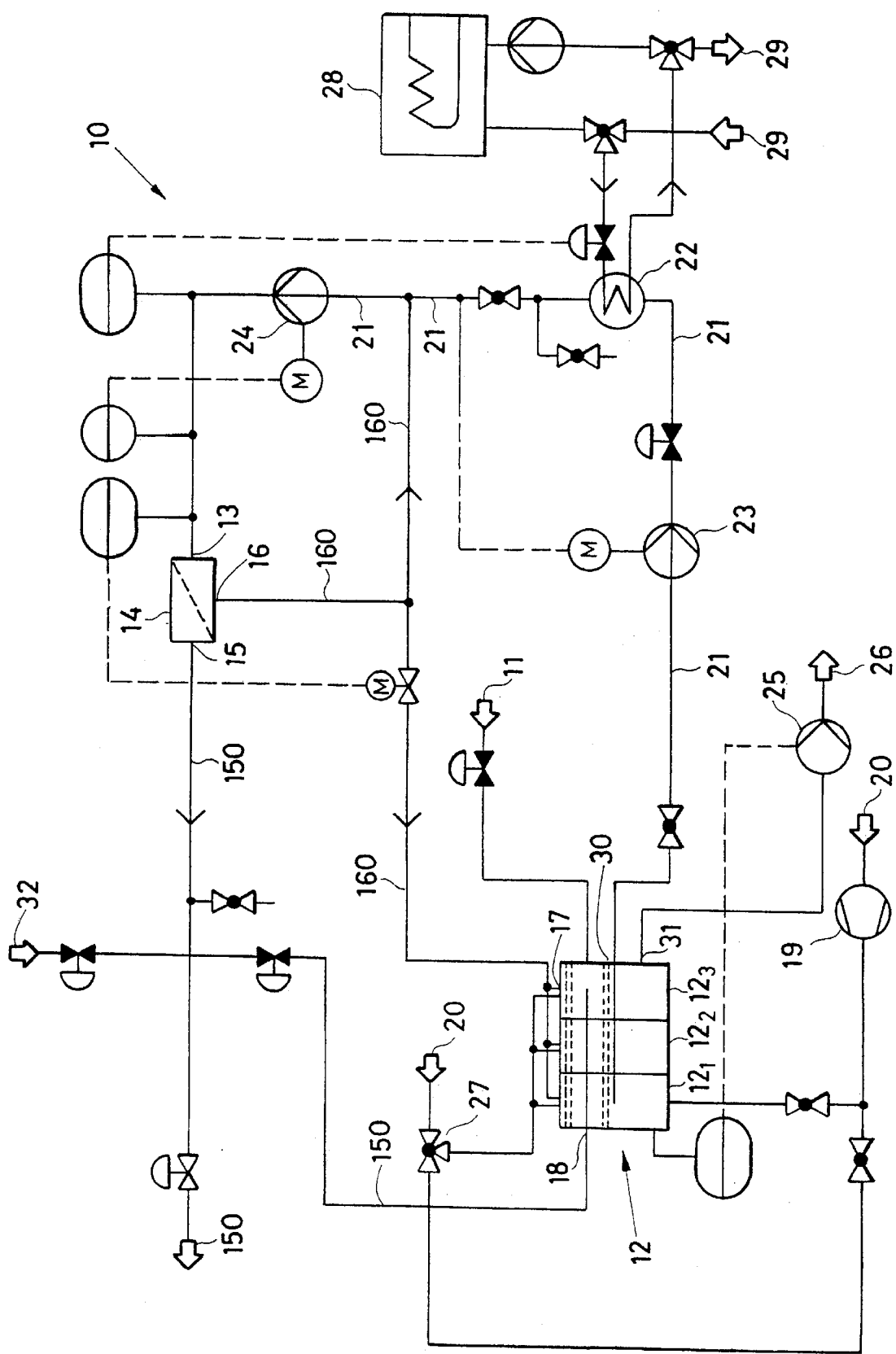

METHOD AND APPARATUS FOR THE PURIFICATION AND/OR TREATMENT OF COMMERCIAL AND/OR INDUSTRIAL WASTE WATERS

BACKGROUND OF THE INVENTION

The invention resides in a process for the purification and/or treatment of communal and/or industrial waste waters particularly for use in marine facilities and an arrangement for performing such a process.

Besides community wastewater processing plants, which are installed to treat the wastewaters from relatively large areas, there are communal and/or industrial wastewater flows, which must be processed or purified locally before they can be discharged into the environment. There are generally three types of decentralized plants with which wastewaters can be purified or, respectively, treated. These are plants found, for example, in communities which are not connected to central communal wastewater treatment and purification plants (case 1). The industrial wastewater treatment for problematic compounds, which, because of unfavorable ratios, have concentrations of CSB to $BSB_5$ (case 2), which cannot be treated in conventional purification or, respectively, treatment plants.

The wastewater treatment in marine facilities such as ships (case 3) poses a particular problem.

Especially in cases 1 and 3 wastewaters of a highly variable composition must be treated. Also, the volume flows vary widely. In case 3, additionally the conditions existing in marine facilities such as ships must be taken into consideration.

Particularly for use in marine installations, for example on board of ships, very rigid rules have been established by international organizations such as the IMO (International Maritime Organization) governing the release of contaminants from marine facilities into the sea. The limits set by these organizations are in some cases substantially lower than the limit values for the discharge of treated wastewaters from land-based stationary treatment and purification plants. Since the seas and, increasingly, sensitive water bodies such as the Arctic and the Antarctic are visited by research vessels and fishing boats and now also by passenger ships (cruise ships) very rigid rules have been established. In the past, the wastewater generated in marine installations has been collected in tanks, at least while a ship was in a harbor or in national waters and was then discharged into the sea in international waters, often without having been reliably purified. In fact, often the wastewater has been discharged without any purification or treatment so that all the waste and contaminants were released into the sea.

This is unacceptable for the reasons given above and will not be permissible in the future. On the other hand, on-board treatment of wastewaters on marine installations requires highly compact equipment because of the limited space available. In addition, the equipment must not be affected by the rolling motion of ships, that is, the treatment apparatus must remain fully operative even if the ship is not stable. Furthermore, the wastewater flows in ships are generally not separated, that is, in effect they represent a mixture of communal and industrial waste waters. Particularly with the introduction of technical solutions (grease, cleaners, tensides, disinfectants, etc.), the ratio of $CSB/BSB_5$ increases above that common in communal wastewaters. Also, changes may be very sudden. Because of the low content of microorganisms present in conventional reaction systems with maximal bio-mass concentrations of 5 g/l, such sudden changes cannot be accommodated. As a result, the biological decomposition of the waste material is much decreased.

It is therefore the object of the present invention to provide a process and apparatus for the purification of wastewater streams, which may be subjected to highly variable hydraulic loads as they are present in marine installations such as ships. The treatment should be quasi-continuous and in a quasi-closed system and should not require any maintenance or attendance by personnel. The process and equipment should also be simple and relatively inexpensive.

SUMMARY OF THE INVENTION

In accordance with the method of the invention, the wastewater to be purified, or respectively, to be treated is supplied to a biological reaction apparatus, which includes suspended therein a bio-mass of high concentration. After treatment in the reaction system, the treated wastewater is supplied to a membrane separation apparatus, in which it is separated into a permeate and a retentate and wherein the permeate is either discharged as useable or pure water or is at least partially returned to the reaction apparatus.

The advantage of the method according to the invention resides essentially in the fact that, with the high bio-mass concentration, the wastewater to be purified reaches already at the exit of the reaction system concentrations, which are not achieved with conventional systems. It is furthermore an important advantage that clean water is separated from the waste water in the membrane separating apparatus in a one-step process, whereas, in conventional systems, viruses and bacteria cannot be eliminated in a single process step. In addition, the process is performed quasi-continuously in a closed circuit.

In an advantageous embodiment of the method, the retentate is at least partially returned to the reaction system for example when sufficient wastewater for purification and treatment is provided.

Although various biological reaction systems, also called bio-reactors, could be utilized, the reaction system according to the invention preferably uses a system operating in accordance with the principle of high cell density fermentation with maximum bio-concentrations of 30 g/l in contrast to the maximally 5 g/l concentration used in conventional systems.

Preferably, the wastewater to be treated is pre-filtered before it is admitted to the reaction system, that is, it is preferably first mechanically cleaned. In this way, larger particles are removed, whereby the wastewater can be better digested by the microorganisms.

In order to provide the oxygen required for the biological digestion, air or oxygen is admixed to the wastewater in such a way that mixers or other mechanical devices are not necessary.

The wastewater, which has been treated in the reaction system often has a temperature, which is different from the operating temperature of the membrane separating apparatus. A membrane separating apparatus and also the biological pretreatment have certain optimal operating temperatures, where the separation efficiency and the biological digestion are highest. It is therefore advantageous to adjust the temperature of the wastewater before treatment.

As the membrane apparatus requires for the separation of the wastewater into a permeate and a retentate a predetermined uniform wastewater pressure at the entrance to the membrane apparatus (feed pressure), the wastewater is pressurized before it is supplied to the membrane apparatus.

The air or oxygen introduced into the reaction system preferably has a pressure of 1 to 1.2 bar, that is, it may be supplied at atmospheric pressure or at an excess pressure of 0.2 bar above atmospheric pressure. Basically however, other pressures may be selected for the oxygen admitted to the reaction system.

Depending on the amount of the wastewater supplied to the treatment apparatus, permeate may be re-circlated if the level of the wastewater (originally wastewater and retentate) in the reaction system reaches a lower predetermined limit. The permeate is discharged for consumption, when the level of the wastewater (originally wastewater, retentate and permeate) in the reaction system reaches an upper limit. The determination of the upper and lower limits is automated thereby eliminating the need for a manual switching. Manual switching may be disadvantageous for the quasi-continuous process as it may not be precise enough.

In order to avoid the need for flushing the membrane separating apparatus, which is normally necessary periodically, that is in order to operate the membrane apparatus in a quasi-continuous manner, at least a part of the retentate and/or the permeate is returned to the membrane separating apparatus with increased pressure. In this way, the flow speed through the membrane separating apparatus is increased so as to prevent the collection of deposits in the apparatus.

The apparatus can be operated over extended periods without the need for a periodic flushing or chemical cleaning.

An apparatus for the purification and/or treating of communal and/or industrial wastewater especially for use in marine installations conventionally includes a biologically operated reaction apparatus for receiving the wastewaters to be purified and/or treated.

In a preferred arrangement, the apparatus according to the invention includes a container which is connected to the inlet of the membrane separating apparatus and the permeate outlet and/or the retentate outlet of the membrane separating apparatus can be selectively switched to inlets of the reaction apparatus.

The advantage of such an arrangement is that, with the switching of the permeate and retentate outlets to the separating apparatus inlet, the whole apparatus can be operated quasi-continuously, that is, it can also be operated, when momentarily no wastewater is supplied to the apparatus or the reaction apparatus. Furthermore, the membrane separating apparatus provides for a virus- and bacteria-tight separation of the circulating system with respect to the permeate, which leaves the apparatus and which is the purified or, respectively, treated wastewater. After-treatment of the permeate for destroying the bacteria and/or viruses is not necessary.

The reaction apparatus is preferably a mixing container, which does not require a mechanical mixer since the air or oxygen is so pumped into the reaction container, that the content is sufficiently mixed.

Preferably, a filtering device is provided by way of which the wastewater to be treated is supplied to the reaction container for pre-filtration. The type of pre-filtration depends on the conditions under which the apparatus is used. The filtering device is preferably in the form of a mechanical filter structure including filters with mesh sizes in the range of 60 to 400 $\mu$m. The filter device may be a back-flush filter.

A heat exchanger is preferably arranged in the connecting line between reaction apparatus and the inlet to the membrane separating device. In this way, the temperature of the wastewater supplied to the membrane separating apparatus can be adjusted to a value providing for optimal operation of the membrane separation apparatus.

Preferably, in the heat exchanger the wastewater can be heated or cooled by supplying to the heat exchanger a fluid heated in a heater or, respectively, a coolant.

In order to ensure that the pressure for the pre-cleaned wastewater as needed for the operation of the membrane apparatus is continuously maintained, it is advantageous to arrange at least one pump in a connecting line extending between the reaction apparatus and the inlet of the membrane separation apparatus. Such a pump or pumps may also be used for pumping at least a partial amount of the retentate generated in the membrane separating apparatus to be re-circulated to the inlet of the membrane separating apparatus.

The reaction apparatus preferably includes a plurality of individual containers each of which can be used alone in connection with the membrane separating apparatus. Such a modular arrangement permits testing of the reaction apparatus and servicing or exchange of the individual containers without shutting down the purification apparatus.

The individual containers are preferably arranged in a parallel flow arrangement, but are operated in a total reaction apparatus arrangement.

Below, an embodiment will be described in greater detail on the basis of the sole schematic figure.

BRIEF DESCRIPTION OF THE DRAWINGS

The sole FIGURE shows a flow scheme of an apparatus for the purification and/or treatment of communal and/or industrial wastewaters according to the invention.

DESCRIPTION OF PREFERRED EMBODIMENTS

Reference is made to the sole figure, which shows a flow scheme for an apparatus plant 10 for the purification and/or treatment of communal and/or industrial wastewaters 11, which plant is operated in accordance with the method described herein. The apparatus plant 10 includes a reaction apparatus 12 comprising a plurality of containers $12_1$, $12_2$, $12_3$. The containers $12_1$, $12_2$ and $12_3$ together form the reaction apparatus 12 and are arranged in a parallel circuit. It is pointed out that the number of three containers is only exemplary; it is not indicative of the size of the reaction apparatus 12. Rather, the number of containers may vary dependent on the purification and treatment requirements for the apparatus plant 10.

The functionally interconnected individual containers $12_1$, $12_2$ and $12_3$ are in communication with the inlet 13 of a membrane separation apparatus 14 by way of a connecting line 21. The connecting line 21 includes two pumps 23, 24 arranged in series and a heat exchanger 22 arranged between the two pump 23, 24. Alternatively, or additionally, a heat exchanger may be arranged in the line 21 between the pump 24 and the membrane separation apparatus 14. The membrane separation apparatus 14 has a retentate outlet 16, which is connected to the inlet of the pump 24 and also to the inlet 17 of the reaction apparatus 12. The retentate leaving the membrane separation apparatus 14 through the exit 16 can be divided into two partial flows. One partial flow is re-circulated to the reaction apparatus 12 and the other to the suction side of the pump 24. The purified or treated permeate 150 leaves the membrane separation apparatus 14 through the exit 15 and leaves the plant 10 as useable water or as blow-down water for return to the environment. The permeate 150 may also be returned to another inlet 18 of the reaction apparatus 12.

Air or oxygen 20 is supplied to the reaction apparatus 12 by means of a pump 19. The air or oxygen may be supplied to the reaction apparatus 12 from the top or from the bottom or both by appropriate adjustment of the three-way valves 27. As air or oxygen introduction members so-called gas-liquid compressors are used which may be operated, for example, hydraulically by the pressure of the retentate 160 of the membrane separating apparatus 12. The wastewater 11, which is to be purified and/or treated by the plant 10 is conducted through a filter device, which may be in the form of a flushable mechanical filter with a mesh size of 60 to 400 µm, but which is not shown in the figure.

The heat exchanger 22 arranged in the line 21 is either heated by a heat-transfer medium heated for example in a heater 28 or it is connected to an apparatus providing a cooling fluid. Depending on the temperature of the wastewater flowing from the reaction apparatus, by way of the pump 23, to the heat exchanger 22, the heat exchanger is operated so that the wastewater supplied to the membrane separating apparatus 14 has an optimal constant temperature when it reaches the inlet 13 of the membrane separating apparatus 14. The temperature can be controlled automatically by sensing the water temperature in the line 21 ahead of the membrane separating apparatus. Instead of a heater 28 for heating heat transfer fluid, a fluid which is already present on board of a ship may be used for heating the wastewater in the heat exchanger 22.

The reaction apparatus 12 is in communication with a pump 25 by way of another exit 31 through which the bio-mass 26 is discharged from the reaction apparatus 12 for deposition in a containment, which is not shown in the drawing, or for use in a way not shown herein.

The membrane separation apparatus 14 operates in accordance with the principle of ultra-filtration with a molecular weight cut-off between 50,000 and 200,000 g/mol. In this way, all micro-organisms such as bacteria, viruses, and also materials in suspensions are retained, that is, none of them are contained in the permeate 150 (water for consumption). With the membrane barrier, the bio-mass concentration in the reaction apparatus 12 can be maintained at a substantially higher concentration than in conventional plants. In order to ensure stable operation of the membrane separation apparatus 14 without the need for chemical cleaning also with the high bio-mass concentration, air under pressure 32 may be periodically blown into the membrane separation apparatus 14 from the permeate side thereof for cleaning the membranes.

The procedure for purifying and/or heating communal and/or industrial wastewaters 11 is as follows: First, the reaction apparatus 12 is charged with a bio-mass of high concentration suspended in water. Alternatively, the process may be started with a start-up culture having a bio-mass concentration of 1 to 2 g/l in the reaction apparatus 12, which is then increased to the desired concentration. For the purifying procedure, the bio-mass concentration finally is for example about 30 g/l, no matter which of the ways is selected. The wastewater to be treated is pre-filtered by mechanical filters and is then supplied to the reaction apparatus 12. By way of the pump 19 and/or the three-way valve 27, air or oxygen 20 is introduced into the reaction apparatus 12. In the reaction apparatus biochemical reactions take place, whereby the wastewaters contained therein are purified until discharge concentrations are achieved.

This preheated or pre-purified wastewater leaves the reaction apparatus 12 through the outlet 30 and reaches, by way of a connecting line 21, the pump 23, which pumps the pre-purified and pre-treated wastewater to the heat exchanger 22 and to the pump 24. In the heat exchanger 22, the pre-purified and pretreated wastewater is brought to a temperature, which is optimal for the separation process in the membrane separation apparatus 14. The wastewater at the optimal temperature is then pumped by the pump 24 to the inlet 13 of, and into, the membrane separation apparatus 14. The pump 23 generates the operating pressure required for proper functioning of the membrane separation apparatus. The pump 24 essentially increases the speed that is it accelerates the wastewater supplied to the membrane separating apparatus.

The pre-purified temperature-adjusted wastewater is separated in the membrane separating apparatus into a permeate 150 and a retentate 160 in a manner known per se. The retentate 160 leaves the membrane separating apparatus 14 and is returned at least partially to the reaction apparatus 12.

Under certain operating conditions of the plant 10 or respectively, the process, wherein no wastewater 11 is supplied to the reaction apparatus, a part of the retentate 160 is returned to the inlet side of the pump 24 in order to permit quasi-continuous operation of the membrane separating apparatus also under this condition, so as to maintain the membrane separation apparatus 14 functional at all times.

The permeate 150 leaves the plant 10 either as useable or clean water or it is returned to the reaction apparatus if no wastewater 11 is supplied to the reaction apparatus 12.

The process operates quasi-continuously, even if no wastewater is produced during certain periods and supplied to the reaction apparatus 12. The recycling of the permeate 150 to the reaction apparatus 12 is controlled by a suitable process control whenever the level of the wastewater 11 (original wastewater 11 and retentate 160) in the reaction apparatus 12 reaches a predetermined lower limit. The permeate is discharged to the outside of the apparatus whenever the level of the wastewater 11 (original wastewater 11, retentate 160 and permeate 150) in the reaction apparatus reaches an upper limit.

The pump 23 operates continuously, that is, the prepurified or pre-treated wastewater is supplied to the membrane separating apparatus 14, or, respectively, to the pump 24 arranged in the connecting line 21 upstream of the membranes separating apparatus 14. It is pointed out that, with the biological decomposition of the content of the wastewater 11 in the reaction apparatus 12, the microorganism population suspended therein grows substantially (increase of the TS content in the system) and the oxygen in the wastewater 11 in the reaction apparatus is consumed. Both values can be determined by suitable detectors and can be utilized for the control of the plant 10 and also as indicators for the functioning of the process according to the invention. The pump 25 mentioned earlier ensures, in combination with the operation of the membrane separating apparatus 14, a stable bio-mass concentration in the reaction apparatus 12. When a predetermined concentration of the bio-mass (dry substance=TS) in the reaction apparatus 12 is exceeded, for example 2 to 5% of the wastewater supply may be pumped out as excess sludge. When the TS content falls below a predetermined value the pump 25 can be switched off controlled by the automatic detection of the TS content.

What is claimed is:

1. A method for the purification and treatment of communal and industrial wastewaters, particularly for use in marine installations, said method comprising the steps of: supplying the wastewater to be treated to a biological reaction apparatus in which a bio-mass of a high concentration is suspended, supplying the wastewater, after treatment in the reaction apparatus, to a membrane separation apparatus, separating said wastewater in said membrane apparatus into a permeate and a retentate, selectively discharging the permeate either as useable or pure water or at least partially returning said useable water to the reaction apparatus and re-circulating at least at times part of said retentate directly back to said membrane apparatus in a circuit flow arrangement while increasing the pressure of said recirculated part so as to maintain a predetermined flow through said membrane apparatus.

2. A method according to claim 1, wherein said retentate is at least partially returned to said reaction apparatus.

3. A method according to claim 1, wherein said wastewater to be treated is pre-filtered before it is introduced into said reaction apparatus.

4. A method according to claim 1, wherein air or oxygen is introduced into the reaction apparatus.

5. A method according to claim 4, wherein said air or oxygen is introduced into the reaction apparatus at a pressure of 1 to 1.2 bar.

6. A method according to claim 1, wherein said wastewater treated in the reaction apparatus is temperature-adjusted before it enters said membrane separation apparatus.

7. A method according to claim 1, wherein the pressure of the wastewater treated in said reaction apparatus is increased before it is supplied to said membrane separation apparatus.

8. A method according to claim 1, wherein the permeate is returned to the reaction apparatus, whenever the level of the wastewater (original wastewater and retentate) in the reaction apparatus has reached a predetermined lower limit, and the retentate is discharged, when the level of the wastewater (original wastewater, retentate and permeate) in the reaction apparatus has reached on upper predetermined limit.

9. An arrangement for the treatment of communal and industrial wastewaters, particularly for use in marine installations, comprising a biologically operated reaction apparatus for the treatment of the wastewater and a membrane separation apparatus having an inlet in communication with said reaction apparatus for receiving the treated wastewater from said reaction apparatus and permeate and retentate outlets, said reaction apparatus consisting of at least one container, which is connected to the inlet of said membrane separation apparatus, said permeate outlet and said retentate outlet of the membrane separation apparatus being switch-blade selectively to the inlets of the reaction apparatus or to respective discharge lines and means for recirculating at least part of said retentate directly back to said membrane apparatus in a circuit flow arrangement including a pump for increasing the pressure of said recirculated retentate to maintain a predetermined flow through said membrane apparatus.

10. An arrangement according to claim 9, wherein said reaction apparatus comprises a mixing container with means for pumping air and oxygen into said mixing container in such a way as to provide for mixing in said mixing container.

11. An arrangement according to claim 9, wherein the wastewater to be treated can be admitted to the reaction apparatus by way of a filtering structure.

12. An arrangement according to claim 11, wherein said filtering structure is a mechanical filter arrangement with a mesh size in the range of 60 to 400 $\mu$m.

13. An arrangement according to claim 9, wherein a pump is provided for supplying air or oxygen to said reaction apparatus.

14. An arrangement according to claim 9, wherein a heat exchanger is disposed in the connecting line between the reaction apparatus and the inlet of the membrane separation apparatus.

15. An arrangement according to claim 14, wherein, selectively, a temperature increasing or a temperature reducing heat transfer medium can be supplied to the heat exchanger.

16. An arrangement according to claim 14, wherein at least one pump is provided in the connecting line between the reaction apparatus and the inlet of the membrane separation apparatus.

17. An arrangement according to claim 9, wherein said reaction apparatus comprises a plurality of individual containers, which are operable each individually as a reaction apparatus.

18. An arrangement according to claim 17, wherein said individual containers are arranged in a parallel flow arrangement.

* * * * *